United States Patent [19]
Louw

[11] Patent Number: 5,531,217
[45] Date of Patent: Jul. 2, 1996

[54] HEATING DEVICE

[76] Inventor: Hendrik H. Louw, 34 Cornwall Street, Gordon's Bay 7150, South Africa

[21] Appl. No.: 335,048

[22] Filed: Nov. 7, 1994

[30] Foreign Application Priority Data

| Nov. 8, 1993 | [ZA] | South Africa | 93/8291 |
| Sep. 23, 1994 | [ZA] | South Africa | 94/7423 |
| Oct. 6, 1994 | [ZA] | South Africa | 94/7801 |

[51] Int. Cl.⁶ .................................................. F24J 2/36
[52] U.S. Cl. ........................ 126/624; 126/652; 126/665; 126/675
[58] Field of Search .................... 126/561–568, 126/624–626, 705, 707, 706, 665, 675

[56] References Cited

U.S. PATENT DOCUMENTS 4,151,830  5/1979  Crombie ............................ 126/626
4,315,497  2/1982  Vardey ............................. 126/624

FOREIGN PATENT DOCUMENTS 2457449  1/1981  France ............................. 126/626

*Primary Examiner*—James C. Yeung
*Attorney, Agent, or Firm*—Ladas & Parry

[57] ABSTRACT

A portable solar heating device is provided comprising an outer housing of transparent synthetic plastics material and a bladder within the outer housing. The bladder is of flexible sheet synthetic plastics material and has an expanded condition when filled with liquid and a collapsed condition when empty. The device has at least one port leading into the bladder, and means for minimising the area over which the bladder contacts the housing when the bladder is in its expanded condition, thereby to leave an airgap between the bladder and the housing over most of the surface area of the bladder.

6 Claims, 6 Drawing Sheets

HEATING DEVICE

FIELD OF THE INVENTION

THIS INVENTION relates to a heating device. It relates in particular to a solar heating device for heating a fluid e.g. water, or the like.

SUMMARY OF THE INVENTION

According to the invention, there is provided a portable solar heating device for heating a fluid, the device including a shell of transparent material;

a flexible bladder for containing the fluid to be heated;

at least one port in the bladder to provide a flow path for the fluid into and out of the bladder; and an airgap between the shell and the bladder.

The device may include two concave shells attached in a back-to-back fashion, the shells defining a cavity in which the bladder is located.

The device may include spacing means for positioning he bladder with respect to each shell when the bladder contains fluid thereby to provide the airgap between each shell and the bladder. Each shell may have a plurality of inwardly protruding ribs, the ribs forming said spacing means.

Each shell may have a peripheral flange and a peripheral portion of the bladder may be sandwiched between the flanges of opposing shells.

Further according to the invention, there is provided a portable solar heating device comprising an outer housing of transparent synthetic plastic material, a bladder within the outer housing, the bladder being of flexible sheet synthetic plastic material and having an expanded configuration when filled with liquid and a collapsed configuration when empty, at least one port leading into the bladder, and means for minimising the area over which the bladder contracts the housing when the bladder is in its expanded condition thereby to leave an airgap between the bladder and the housing over most of the surface area of the bladder.

BRIEF DESCRIPTION OF THE DRAWINGS

Embodiments of the invention are now described, by way of example, with reference to the accompanying diagrammatic drawings.

In the drawings.

DETAILED DESCRIPTION OF THE DRAWINGS

Figure 1:
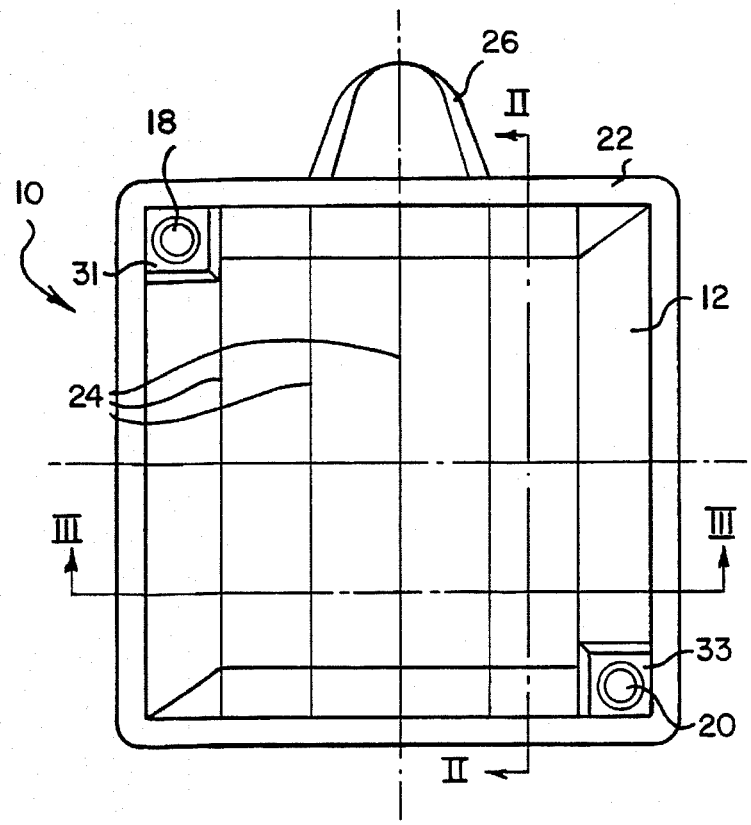
FIG. 1 shows a front view of a first embodiment of a solar heating device in accordance with the invention for heating water.
Figure 2:
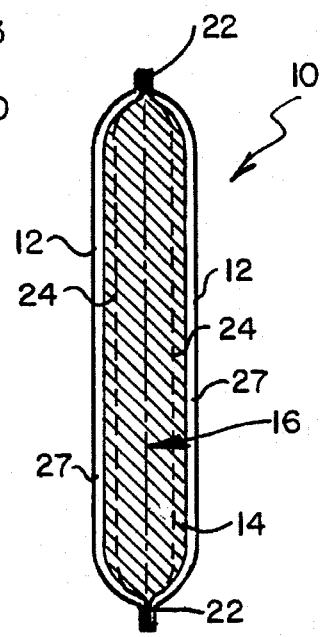
FIG. 2 shows a longitudinal-sectional view of the heating device of FIG. 1 taken at II—II.
Figure 3:
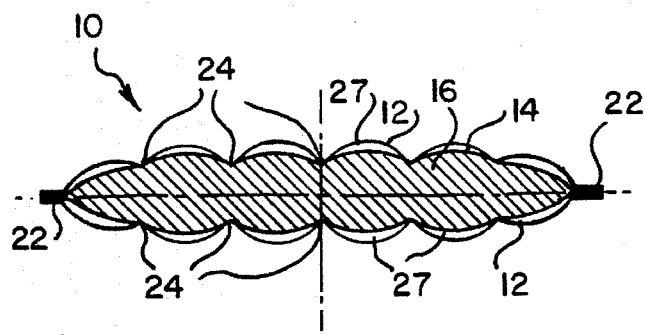
FIG. 3 shows a cross-sectional view of the heating device of FIG. 1 taken at III—III.
Figure 5:
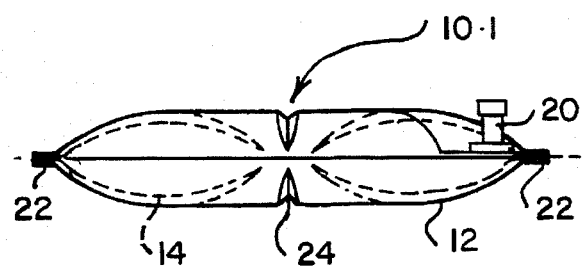
FIG. 5 shows a bottom view of the heating device of FIG. 4.
Figure 4:
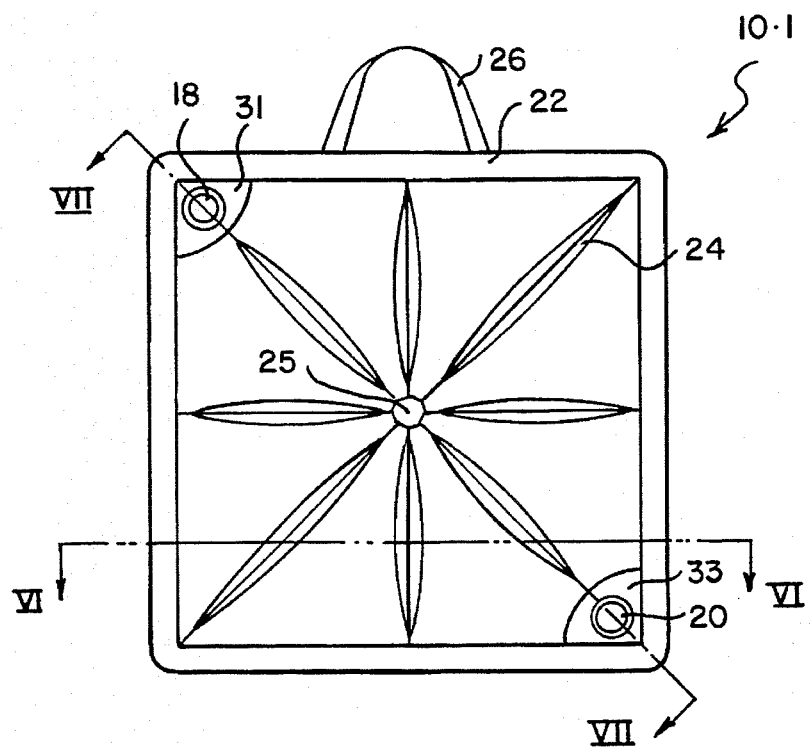
FIG. 4 shows a second embodiment of the solar heating device in accordance with the invention for heating water.
Figure 6:
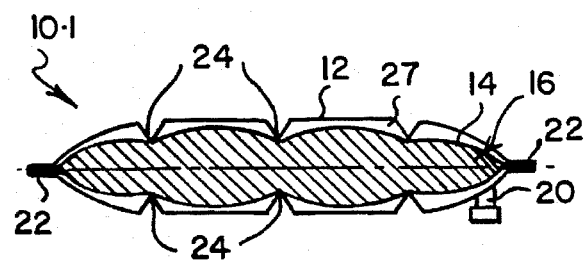
FIG. 6 shows a cross-sectional view of the heating device of FIG. 4 taken at VI—VI.
Figure 8:
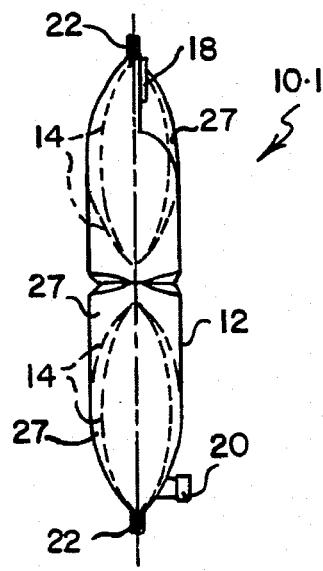
FIG. 8 shows a side view of the heating device of FIG. 4.
Figure 7:
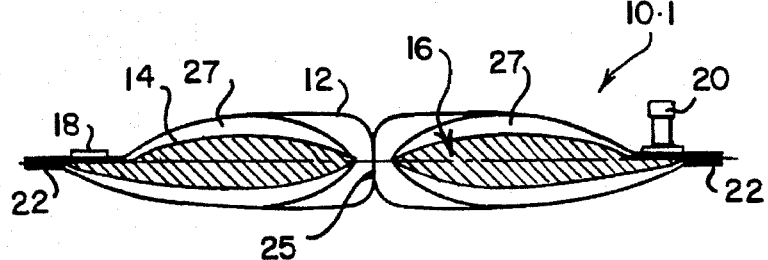
FIG. 7 shows a diagonal-sectional view of the heating device of FIG. 4 taken at VII—VII.
Figure 9:
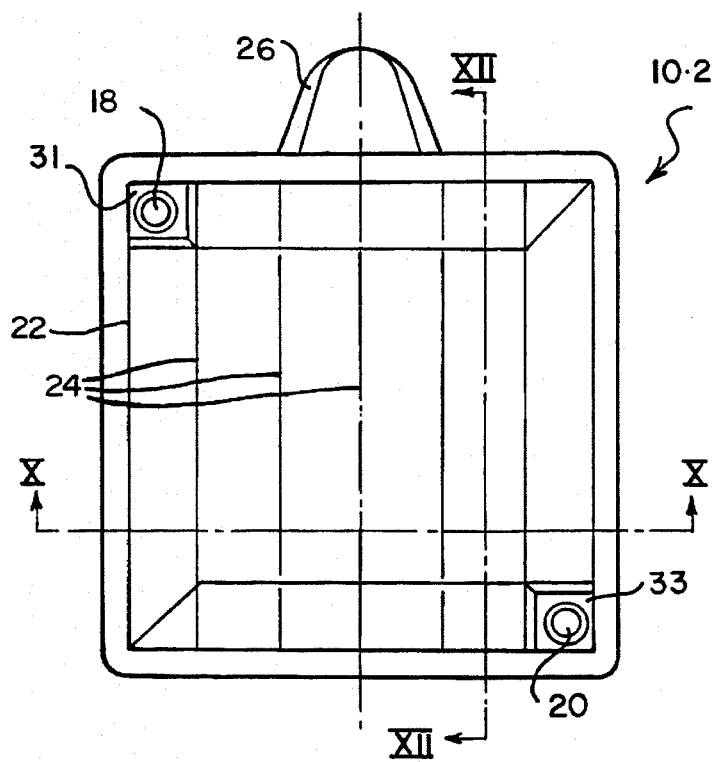
FIG. 9 shows a front view of a third embodiment of the solar heating device in accordance with the invention for heating water.
Figure 10:
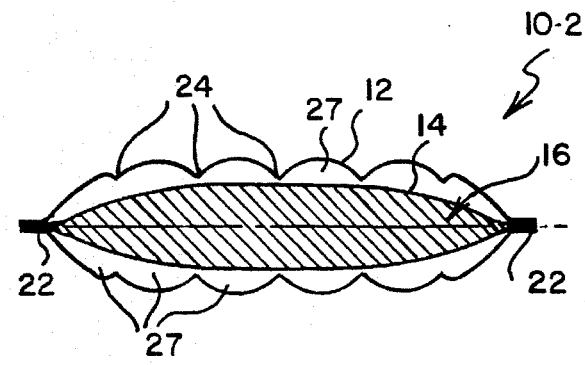
FIG. 10 shows a cross-sectional view of the heating device of FIG. 9 taken at X—X.
Figure 12:
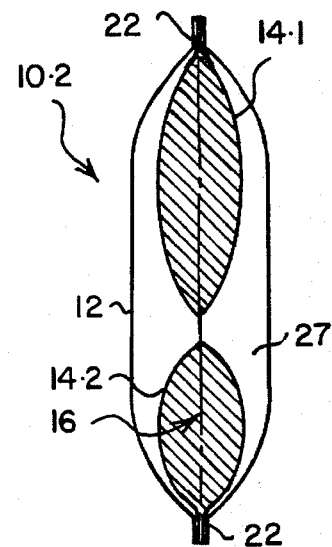
FIG. 12 shows a longitudinal-sectional view of the heating device of FIG. 9 taken at XII—XII.

Referring first to FIGS. 1 to 3 of the drawings, reference numeral 10 generally indicates a portable solar heating device in accordance with the invention for heating water. The device 10 has two rigid shells 12 (shown clearly in FIG. 2) of a transparent material, a flexible bladder 14 located in a spaced relationship relative to each shell 12 when the bladder 14 contains water 16, and inlet and outlet ports 18, 20 respectively which provide a flow path for water 16. The shells 12 embodiment an outer housing and the bladder 14 ks of flexible sheet synthetic plastic material.

Each shell 12 is concave An shape and typically made of a rigid synthetic plastic material such as PVC or the like. Each shell 12 has a peripheral flange 22 and a peripheral portion of the bladder 14 is sandwiched between flanges 22 Of opposing shells 12. The flanges 22 of the shells 12 are attached to one another, preferably by welding them together, and the shells 12 define a cavity which houses the bladder 14. Each shell 12 has longitudinal ribs 24 which extend the length of the shell 12. The ribs 24 provide spacing means for spacing the bladder thereby creating airgaps or air pockets 27 between the shell 12 and the bladder 14 when the bladder 14 is filled with water 16.

The inlet and outlet ports 18, 20 are provided in landings 31, 33 respectively, situated at diagonally opposed corners of one of the shells 12. The inlet port 18 is typically funnel-shaped in order to facilitate filling of the bladder 14 with water 16 and the outlet port 20 has dispensing means in the form of a tap (not shown) selectively to dispense water 16 from the bladder 14. The tap can be one of those that is commonly used for dispensing wine or other liquid from a "bag-in-a-box" construction.

The solar heating device 10 further includes a handle 26 which is attached to one or both flanges 22. In certain circumstances, the handle 26 is formed integrally with one or both of the flanges 22. The handle 26 facilitates hanging of the device 10 in a sunny location, e.g. a tree, so that it can be exposed to direct sunlight. The handle 26 further assists a user in transporting the device 10, for example, in conveying the device 10 to a sunny location after it has been filled with water 16.

In use, the device 10 is filled with water 16 via the inlet port 18 whereupon the flexible bladder 14 expands under the pressure of the water 16. When the device 10 is placed in the sun, the transparent shell 12 allows sunlight to pass through it and incident light falls on the bladder 14. The bladder 14 is typically made of a non-reflective sheet synthetic plastic material such as black PVC, or the like. The air pockets 27 between the shell 12 and the bladder 14 provide a greenhouse effect whereby heat radiated from the bladder 14 is reflected back towards the bladder 14 by the shell 12 thereby maximizing heating of the water 16 contained in the bladder 14. Typically the material from which the bladder 14 and the shell 12 are made include a U-V stabilizer to minimize damage due to prolonged exposure to the sun.

Further embodiments of the solar heating device 10 are depicted in FIGS. 4, 9, 13, 14 and 15 and lake reference numerals have been used to indicate the same or similar features of the embodiment of the heating device 10 depicted in FIGS. 1 to 3.

In the solar heating device 10.1 of FIGS. 4 to 8, the ribs 24 diverge radially outwardly from sunken central portions 25 of the shells 12 which are attached to the bladder 14. As in the case of the longitudinally extending ribs 24 of the device 10 (shown in FIGS. 1 to 3), the ribs 24 space the bladder 14 from the shell 12 creating air pockets or airgaps 27 thereby creating a greenhouse effect in use. The landings 31, 33 are of a slightly different shape to the landings 31, 33 depicted in FIG. 1 but fulfil the same function.

Figure 11:
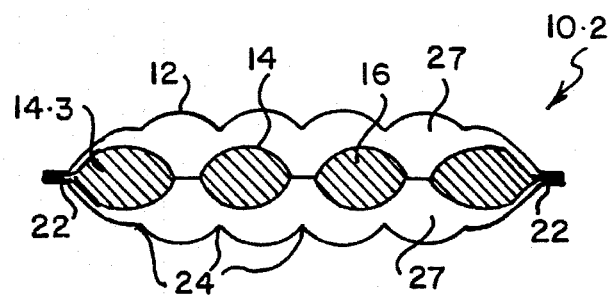
FIG. 11 shows a cross-sectional view of the heating device of FIG. 9 taken at XI—XI.

The embodiment of the solar heating device 10.2 depicted in FIGS. 9 to 12 has similar ribs 24 provided in its shell 12 to those of the solar heating device 10 of FIGS. 1 to 3. Unlike the embodiments of the solar heating device depicted in FIGS. 1 to 8, the solar heating device 10.2 has a bladder 14 which has a primary chamber 14.1 (see FIG. 12) and a secondary chamber 14.2, both of which extend in a lateral direction. The primary and secondary chambers 14.1, 14.2 are interconnected by means of passages 14.3 as shown in FIG. 11. The provision of the chambers 14.1, 14.2 minimizes the area of contact between the bladder 14 and each shell 12.

Figure 13:
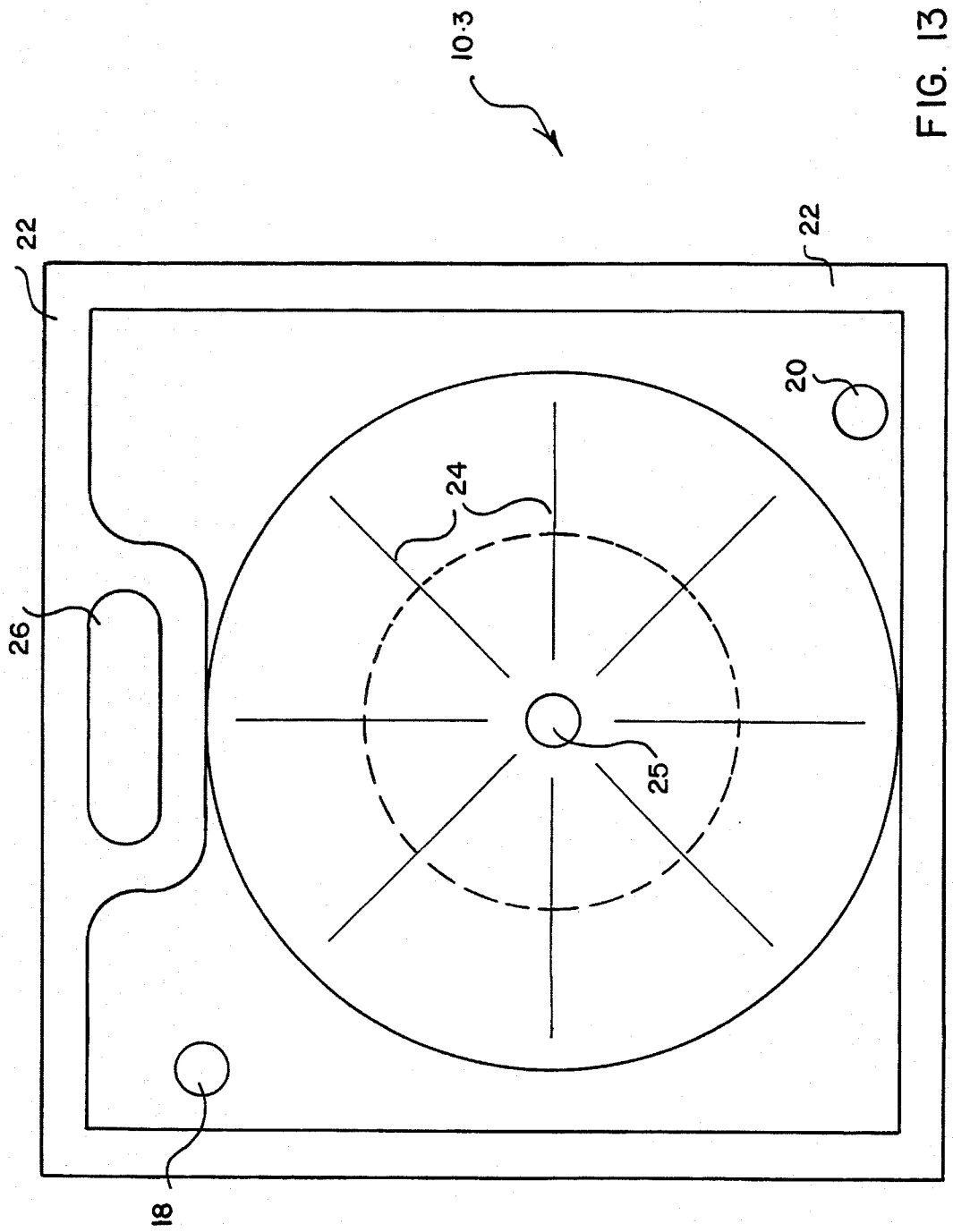
FIG. 13 shows a front view of a fourth embodiment of the solar heating device in accordance with the invention.

In the solar heating device 10.3 depicted in FIG. 13, the handle 26 is embodiment ed integrally with the flanges 22 and the ribs 24 extend radially outwardly from sunken central portions 25 which are attached to the bladder 14.

Figure 14:
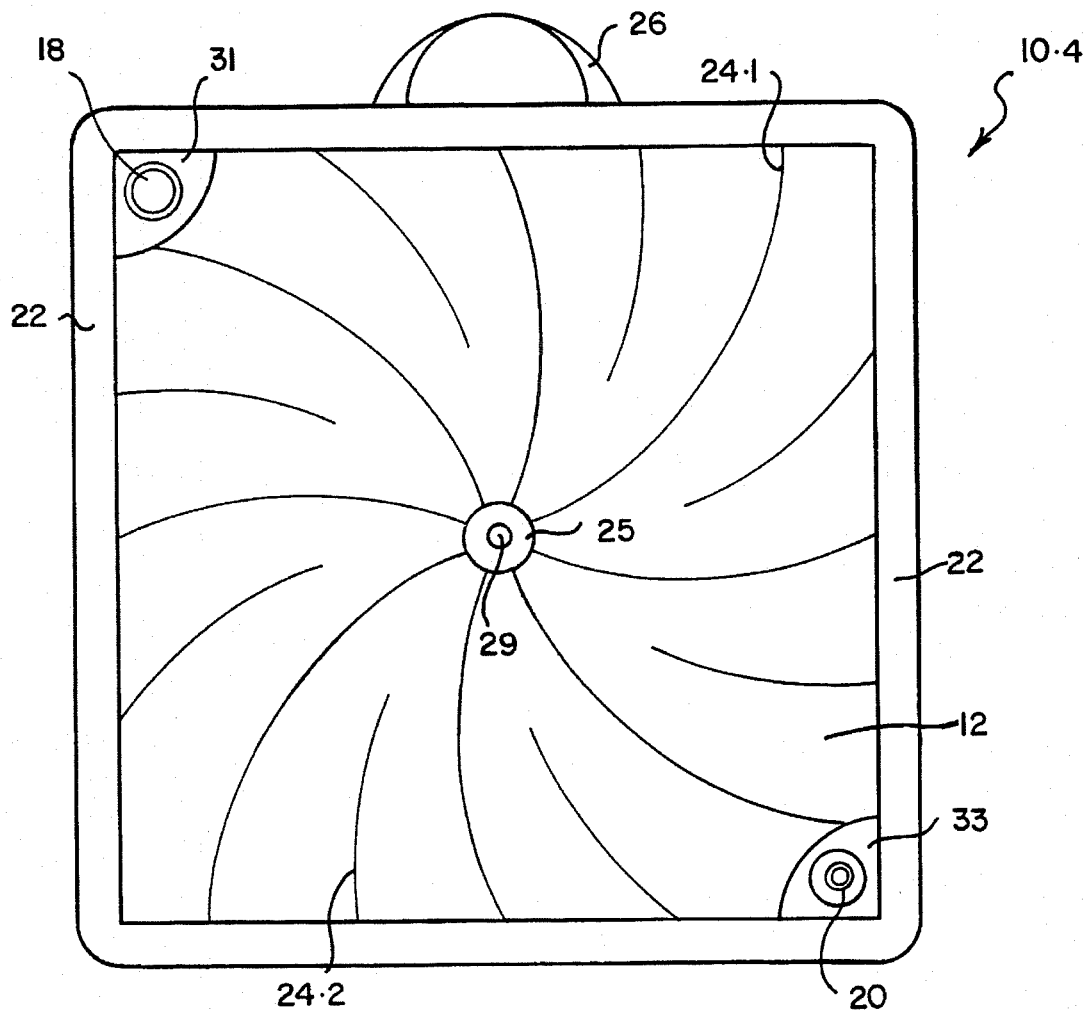
FIG. 14 shows a fifth embodiment of the solar heating device in accordance with the invention.

The solar heating device 10.4 depicted in FIG. 14 has curved long and short ribs 24.1, 24.2 which extend outwardly from a central portion 25 of the device 10.4. A hole 29 is provided in a reinforced region 39 of device 10.4 to permit the device 10.4 to be secured to a post or the like thereby to prevent theft of the device 10.4. It will be understood that all of the embodiments herein described may have an attachment embodiment formation such as a hole to allow it to be secured to a post, eg by means of a chain and a padlock.

Figure 15:
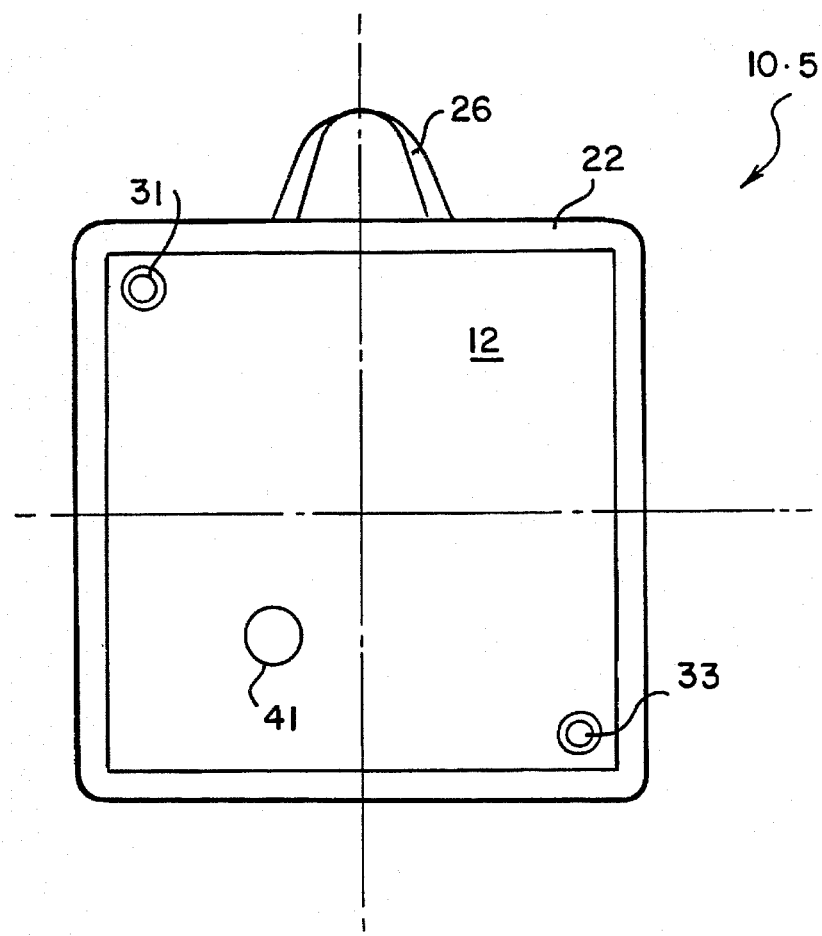
FIG. 15 shows a front view of a sixth embodiment of the solar heating device in accordance with the invention.
Figure 16:
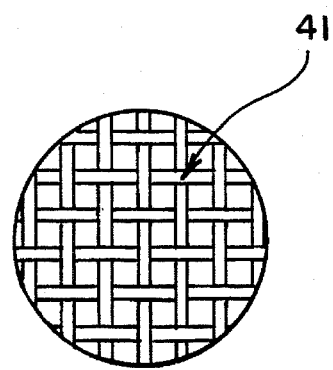
FIG. 16 shows a plan view of a section of a spacing mesh used in the solar heating device of FIG. 15.

In the solar heating device 10.5 which is depicted in FIG. 15 spacing means in the embodiment of a material mesh between the bladder 14 and the shell 12 (see FIG. 16) is employed in order to space the bladder 14 from the shell 12.

The invention extends to a building element which is in the embodiment of a solar heating device as depicted in FIGS. 1 to 16. The skirt or flange 22 provides mounting means whereby the element may be mounted in an aperture in a wall of a building. In certain circumstances, the inlet port 18 and outlet port 20 are provided in opposed shells 12. In this event, the devices 10, 10.1 to 10.5 may be mounted with the outlet port 20 on the inside of the building and the inlet port 18 would then face outwardly to facilitate dispensing of and filling with water.

The Applicant believes that the rigid outer shells 12 of synthetics plastic material increases the durability of the solar heating devices 10, 10.1 to 10.5. In particular, the rigid outer shells 12 protect the bladder 14 from inadvertent puncturing and facilitates the creation of the air pockets 27 thereby to achieve the greenhouse effect in use. The rigid outer shells 12 allow the solar heating devices 10, 10.1 to 10.5 to be hung in trees such as thorn trees without fear of damaging the devices 10, 10.1 to 10.5. The Applicant further believes that the sunken central portions 25 facilitates balancing of the solar devices 10, 10.1 to 10.5 on the head of a person, which is a common technique of conveyance of articles in less affluent societies.

I claim:

1. A portable-solar heating device for heating water, the device including a self supporting outer housing of transparent synthetic plastic material bounding a heating cavity, the outer housing being of rigid material whereby the volume of said heating cavity remains substantially constant irrespective of changes in pressure and temperature, a heat absorbing bladder within said heating cavity and secured to said housing, the bladder being of resiliently flexible material and being capable of expansion when filled with water to be heated, at least one port in the bladder which is accessible from outside said housing and which provides a flow path through which water can flow into and out of the bladder, a plurality of spaced apart ribs on the inner face of said housing and housing parts which are between the ribs, the ribs protecting into said cavity towards said bladder and being contacted by said bladder when the bladder expands while it is being filled, the ribs holding the bladder away from said parts of the housing thereby to embodiment air gaps bounded by the ribs, the parts of the housing between the ribs and the bladder.

2. A portable solar heating device as claimed in claim 1, and in which said housing includes two concave shells with concave inner faces, the shells being attached to one another and defining-said cavity in which the bladder is located, each shell having ribs on the inner face thereof.

3. A portable solar heating device as claimed in claim 2, in which each shell has a central area and a periphery, there being ribs which run outwardly from said central area of the respective shell towards the periphery of that shell.

4. A portable solar heating device as claimed in claim 2, in which each shell has a peripheral flange and a peripheral portion of the bladder is sandwiched between the flanges of the shells.

5. A portable solar heating device as claimed in claim 2, in which each shell has a central area and a periphery, there being a first array of ribs which run outwardly from the central area to the periphery and a second array of ribs which run inwardly from the periphery towards said central area, each rib of each array being between two ribs of the other array.

6. A portable solar heating device as claimed in claim 1, in which said housing includes two shells with concave inner faces, the shells being attached to one another and defining said cavity in which the bladder is located, each shell having ribs on the inner face thereof, a central portion of each shell being depressed, when viewed from externally of the housing, and attached to the bladder whereby a central portion of the bladder is sandwiched between said depressed central portions of the shells.

* * * * *